United States Patent Office 2,902,756
Patented Sept. 8, 1959

2,902,756

METHOD AND MATERIAL FOR METALLIZING CERAMICS

Daniel J. Cavanaugh, Kearny, N.J., assignor to Radio Corporation of America, a corporation of Delaware No Drawing. Application October 18, 1955
Serial No. 541,288

15 Claims. (Cl. 29—473.1)

This invention relates to improved methods and materials for metallizing ceramic bodies. More particularly, one aspect of the invention relates to an improved composition of matter including tungsten and iron for metallizing ceramic bodies.

In general, the bonding of metallic coatings to ceramic bodies is relatively difficult. One of the most successful metallizing materials for most ceramic bodies has been a mixture of tungsten and iron powders. Of all ceramic materials, however, beryllia has been one of the most difficult to metallize. Standard metallizing mixtures such as molybdenum-manganese powder and tungsten-iron powder give very little bonding, if any, to beryllia ceramic bodies.

It is therefore an object of this invention to provide an improved material for metallizing beryllia as well as other ceramic bodies.

A further object of the invention is to provide an improved method for metallizing beryllia or other ceramic bodies.

Briefly, these objects and other advantages of the invention are attained by the discovery that the addition of silicon dioxide and titanium dioxide to the tungsten-iron mixes previously used for ceramic metallizing results in a strong adherent bond between the ceramic body and the metallic surface formed.

According to a preferred example, beryllia ceramic bodies are metallized according to the invention by first mixing tungsten, iron, $SiO_2$ and $TiO_2$ powders in the following proportions. To a tungsten-iron mixture of nine parts by weight tungsten and one part by weight iron; about 18% by weight $SiO_2$, and 3% by weight $TiO_2$ is added. The particle size of the tungsten and iron is preferably between 1 and 4 microns in order to assure intimate contact with the ceramic surface. Thus, the mixture comprises the previously used tungsten-iron mixture and about 21% $SiO_2$—$TiO_2$ of the weight of the tungsten and iron mixture, with the ratio of $SiO_2$ to $TiO_2$ being six to one. The powders are mixed thoroughly in the dry state and then are mixed into a paste by adding an ethyl acetate and nitrocellulose binder until a paint-like consistency is obtained. The binder may be any of those commonly used and known in the art, such as ethyl cellulose or methacrylate resins, which decompose upon heating leaving little or no residue. An excess amount of binder may be used to cause slow drying and to promote adherence to the beryllia surface. An illustrative example is 10 grams iron-tungsten, 2.1 grams $SiO_2$—$TiO_2$ in 3–4 cc. of a binder comprising about 1 gram of nitrocellulose per 43 cc. of ethyl acetate.

The paste containing the metallizing mixture is applied to the beryllia ceramic surface preferably with a camel's hair brush. Other methods of applying the paste are possible such as by spraying or by dipping the body into the paste. When applying the paste by brush, the paste should have a consistency comparable to that of paint. A smooth coating about .002 inch thick can be obtained by brushing the paste with a paint-like consistency onto the ceramic surface.

The ceramic body which has thus been coated is then placed into a molybdenum boat, care being taken to prevent contact between the metal powder coating and the surface of the boat. Alternatively, instead of a molybdenum boat, porous alumina plates may be employed. The molybdenum boat containing the coated ceramic is then placed in a furnace and fired in hydrogen at a temperature of about 1600° C. for about 5 to 10 minutes. Firing may be accomplished in any suitable reducing atmosphere although the best metal-to-ceramic bond appears to be obtained when the firing is in hydrogen. Another good reducing atmosphere which may be used is "forming gas" consisting of 5–10% hydrogen with the balance nitrogen. The firing temperature is not critical and depends upon the characteristics of the beryllia itself. Actually, temperatures between 1550° and 1650° C. have been found suitable.

Upon the conclusion of the firing, it will be found that a strong adherent bond has been effected between the beryllia ceramic body and the metallizing tungsten-iron mixture. The metallized area can then be nickel or copper plated, if desired, so that the body may be brazed to another metallic body, with hard or soft solder. In general, the iron-tungsten metallized area is not easily wet for brazing purposes, hence the desirability of plating the area with nickel or copper. After the metallized ceramic body is plated with nickel or copper it is placed in contact with the metal body or part to which it is to be brazed. The metallized-plated area is between the two bodies. Additional brazing materials and fluxes may be employed to enhance the brazing process. It has been found that hard or soft solders may be used for this purpose depending upon the ultimate use to which the joined bodies may be put; if intended for use in apparatus subject to high operating temperatures, it is preferred to use the hard solders because of their higher melting points. By "soft" solders it is meant to include solders containing relatively low melting point materials such as bismuth, lead, cadmium, or tin, for example. "Hard" solders include materials having relatively higher melting points such as silver or copper or alloys thereof. These brazing materials are well known and are commercially obtainable under various trade names. Typical suitable examples are "Sil-Fos" and "BT Solder", manufactured and sold by Handy and Harman Co. of Bridgeport, Connecticut. "Sil-Fos" comprises 80% copper, 15% silver, and 5% phosphorus; "BT Solder" is a eutectic solder comprising 28% copper and 72% silver. After the two bodies are in contact with the brazing material between the metal body and the plated-metallized portion of the ceramic body, the assembly is fired to make the braze.

The quantity of the $SiO_2$—$TiO_2$ powder added to the standard tungsten-iron mixture may be varied considerably. The percentage by weight of the $SiO_2$—$TiO_2$ in the example given was 21%; it has been found that the percentage by weight of the $SiO_2$—$TiO_2$ may be varied from 18 to 28% of the weight of the tungsten and iron and still produce excellent bonding qualities. However, the best results are obtained by maintaining the $SiO_2$—$TiO_2$ ratio at about six to one. Thus, in the example given the 21% $SiO_2$—$TiO_2$ comprises about 18% $SiO_2$ and 3% $TiO_2$.

Although a metallizing mixture of 9 parts by weight of tungsten to 1 part by weight of iron is preferred, the invention may be used with any other proportions of these elements. Beryllia bodies can be metallized according to the invention with iron or tungsten alone. However, the strongest bond between the metal and ceramic is formed by the mixture of tungsten and iron in the preferred proportion given. In any case the percentage by weight of $SiO_2$—$TiO_2$ added is the same.

The invention is of particular advantage wherever it is desired to metallize beryllia ceramic bodies. One important application of the invention is the metallizing of beryllia ceramic insulators so that they can be brazed to a metallic cap in the manufacture of electron tubes where high thermal conductivity is required through the ceramic. Beryllia is a particularly desirable ceramic to use where rapid heat transfer is required because of its high thermal conductivity factor. In many applications, however, it is desired to join the beryllia bodies to metallic parts of the device in which used. The invention thus is of great advantage for permitting joinder of such beryllia bodies to metallic bodies.

What is claimed is:

1. The method of metallizing the surface of a ceramic body comprising the steps of: coating said surface with a mixture of at least one element selected from the group consisting of iron and tungsten with $SiO_2$ and $TiO_2$, said $SiO_2$ and $TiO_2$ being from 18 to 28% by weight of said iron and tungsten the ratio of said $SiO_2$ to said $TiO_2$ being about six to one, and firing said body having said coated surface at a temperature between 1550° and 1650° C.

2. The method according to claim 1 wherein said ceramic body is beryllia.

3. The method according to claim 1 wherein said coated body is fired in a reducing atmosphere of hydrogen.

4. The method according to claim 1 wherein said mixture comprises a tungsten-to-iron ratio of about 9 to 1 and an $SiO_2$—$TiO_2$ mixture weighing from 18 to 28% of the weight of the tungsten and the iron.

5. The method according to claim 4 wherein said coated body is fired in a reducing atmosphere of hydrogen.

6. The method of metallizing the surface of a beryllia body comprising the steps of: coating said surface with a mixture of nine parts by weight of powdered tungsten to one part by weight of powdered iron and containing from 18 to 28% of the tungsten-iron weight a mixture of $SiO_2$ and $TiO_2$, the ratio of said $SiO_2$ to $TiO_2$ being about six to one, and firing said body having said coated surface in hydrogen at a temperature between 1550° and 1650° C.

7. The method according to claim 6 wherein said percentage of said $SiO_2$—$TiO_2$ mixture is 21% by weight of said tungsten-iron weight.

8. The method according to claim 6 wherein said firing temperature is about 1600° C.

9. The method according to claim 6 including the step of plating said metallized surface with a metal suitable for brazing.

10. The method according to claim 9 wherein said plated metal is selected from the group consisting of copper and nickel.

11. The method according to claim 6 wherein said mixture is suspended in a heat-decomposable organic vehicle.

12. The method according to claim 11 wherein said vehicle containing said mixture is applied to said surface to a thickness of about .002 inch.

13. The method of bonding a body of beryllia to a metallic body comprising the steps: coating the surface of said beryllia body with a paste comprising a heat-decomposable organic binder in which has been suspended a mixture of nine parts by weight of powdered tungsten to one part by weight of powdered iron and containing a mixture of 18% $SiO_2$ and 3% $TiO_2$ relative to the weight of said powdered tungsten and powdered iron; firing said body having said coated surface in hydrogen at a temperature of 1600° C. for about 5 to 10 minutes to form a metallized tungsten-iron area bonded to said surface of said body; plating said metallized area with a metal selected from the group consisting of copper and nickel; contacting said beryllia body to said metallic body with said plated metallized surface therebetween; and heating said bodies to brazing temperature of said plated metal.

14. A metallizing composition for ceramic bodies consisting essentially of nine parts by weight of powdered tungsten to one part by weight of powdered iron and containing from about 18 to 28% of said tungsten and iron weight of a mixture of $SiO_2$ and $TiO_2$, the ratio of said $SiO_2$ to $TiO_2$ being about six to one.

15. A metallizing composition for ceramic bodies consisting essentially of nine parts by weight of powdered tungsten to one part by weight of powdered iron and about 18% by weight $SiO_2$ and 3% by weight $TiO_2$ relative to the weight of said powdered tungsten and said powdered iron.

References Cited in the file of this patent

UNITED STATES PATENTS

| | | |
|---|---|---|
| 2,590,893 | Sanborn | Apr. 1, 1952 |
| 2,667,427 | Nolte | Jan. 26, 1954 |
| 2,715,593 | Clark | Aug. 16, 1955 |

FOREIGN PATENTS

| | | |
|---|---|---|
| 138,506 | Australia | Aug. 28, 1950 |